(12) United States Patent
Saeki

(10) Patent No.: US 10,894,564 B2
(45) Date of Patent: Jan. 19, 2021

(54) VEHICLE BODY REAR PORTION STRUCTURE

(71) Applicant: Toyota Jidosha Kabushiki Kaisha, Toyota (JP)

(72) Inventor: Koji Saeki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 128 days.

(21) Appl. No.: 16/223,706

(22) Filed: Dec. 18, 2018

(65) Prior Publication Data

US 2019/0193792 A1   Jun. 27, 2019

(30) Foreign Application Priority Data

Dec. 26, 2017   (JP) ................................. 2017-248949

(51) Int. Cl.
   *B62D 25/08*   (2006.01)
   *B62D 27/06*   (2006.01)
   *B62D 25/20*   (2006.01)

(52) U.S. Cl.
   CPC ......... *B62D 25/08* (2013.01); *B62D 25/2027* (2013.01); *B62D 25/2036* (2013.01); *B62D 27/065* (2013.01)

(58) Field of Classification Search
   CPC .. B62D 25/08; B62D 27/065; B62D 25/2036; B62D 25/2027
   See application file for complete search history.

(56) References Cited

U.S. PATENT DOCUMENTS 5,829,824 A * 11/1998 Yamamuro .......... B62D 25/087
                                                              296/204

FOREIGN PATENT DOCUMENTS

JP        2012-006544 A     1/2012

\* cited by examiner

*Primary Examiner* — D Glenn Dayoan
*Assistant Examiner* — Melissa Ann Bonifazi
(74) *Attorney, Agent, or Firm* — Dinsmore & Shohl LLP

(57) ABSTRACT

A vehicle body rear portion structure includes a floor panel, rear wheel houses arranged on both sides of the floor panel in a vehicle width direction, a rear seat disposed between the rear wheel houses, braces each arranged at a vehicle cabin inside part above each of the rear wheel houses, and a cross member extending along the vehicle width direction between the braces. The brace is provided with a front side fastening portion positioned on a front side of the brace in a vehicle body front-rear direction and a rear side fastening portion positioned on a rear side of the brace in the vehicle body front-rear direction. Each of end edge portions on both sides of the cross member in a longitudinal direction abuts against one of the front side fastening portion and the rear side fastening portion and is fastened to the brace.

8 Claims, 9 Drawing Sheets

VEHICLE BODY REAR PORTION STRUCTURE

CROSS-REFERENCE TO RELATED APPLICATIONS

This application claims priority to Japanese Patent Application No. 2017-248949 filed on Dec. 26, 2017, which is incorporated herein by reference in its entirety including the specification, drawings and abstract.

BACKGROUND

1. Technical Field

The disclosure relates to a vehicle body rear portion structure and, more particularly, to an attachment structure for a cross member extending along a vehicle width direction between braces (also called "strainers") respectively arranged in rear wheel houses on both sides in the vehicle width direction.

2. Description of Related Art

In the related art, a structure is known as a vehicle body rear portion structure as disclosed in Japanese Unexamined Patent Application Publication No. 2012-006544 (JP 2012-006544 A). In this structure, a cross member (referred to as a member upper side member in JP 2012-006544 A) that extends along a vehicle width direction between braces respectively arranged in rear wheel houses on both sides in the vehicle width direction is welded to each brace and a floor panel upper surface. By the cross member being welded as described above, the rigidity of a vehicle body rear portion can be enhanced. In JP 2012-006544 A, a seat cushion of a rear seat is placed and supported on the upper surface of the cross member.

SUMMARY

Different types of vehicles have different rear seat arrangement positions in a vehicle body front-rear direction. Accordingly, in order to sufficiently ensure the foot space of an occupant seated on the rear seat and achieve body commonization to the maximum extent possible for different types of vehicles, it is desirable to change the arrangement position of the cross member in accordance with the arrangement position of the rear seat. Specifically, in types of vehicles in which the arrangement position of the rear seat is on a relatively rear side, it is desirable to set the arrangement position of the cross member on a rear side as compared with types of vehicles in which the arrangement position of the rear seat is on a relatively front side in order to sufficiently ensure an occupant's foot space.

As described above, both ends of the cross member in the longitudinal direction (vehicle width direction) are respectively welded to the braces. Accordingly, in order to obtain a cross member arrangement position in accordance with a rear seat arrangement position, the braces need to be individually designed in accordance with the rear seat arrangement position. Accordingly, the number of places requiring individual design due to different vehicle types (due to different rear seat arrangement positions) increases and reducing the number of places requiring individual design is limited.

The disclosure provides a vehicle body rear portion structure in which the number of places requiring individual design due to different rear seat arrangement positions can be reduced.

An aspect of the disclosure relates to a vehicle rear portion structure. The vehicle rear portion structure includes a floor panel, rear wheel houses arranged on both sides of the floor panel in a vehicle width direction, a rear seat disposed between the rear wheel houses, braces each arranged at a vehicle cabin inside part above each of the rear wheel houses, and a cross member extending along the vehicle width direction between the braces. In the vehicle body rear portion structure, the brace is provided with a front side fastening portion positioned on a front side of the brace in a vehicle body front-rear direction and a rear side fastening portion positioned on a rear side of the brace in the vehicle body front-rear direction. Each of end edge portions on both sides of the cross member in a longitudinal direction abuts against one of the front side fastening portion and the rear side fastening portion and is fastened to the brace.

According to the aspect of the disclosure, the cross member is arranged on a relatively front side in the vehicle body front-rear direction in a case where each of the end edge portions on both sides of the cross member in the longitudinal direction abuts against and is fastened to the front side fastening portion of each brace. In a case where each of the end edge portions on both sides of the cross member in the longitudinal direction abuts against and is fastened to the rear side fastening portion of each brace, the cross member is arranged on a relatively rear side in the vehicle body front-rear direction. As a result, the cross member can be arranged on a relatively front side in the vehicle body front-rear direction in types of vehicles in which the arrangement position of the rear seat is on a relatively front side and the cross member can be arranged on a relatively rear side in the vehicle body front-rear direction in types of vehicles in which the arrangement position of the rear seat is on a relatively rear side by appropriately selecting the abutting position of the cross member with respect to the brace. Accordingly, an arrangement position of the cross member (position in the vehicle body front-rear direction) suitable for the arrangement position of the rear seat can be obtained without requiring individual design of the brace and the like attributable to different vehicle types (attributable to different arrangement positions of the rear seat). As a result, it is possible to reduce the number of places requiring individual design due to different rear seat arrangement positions, to make a contribution to body commonization, and to suppress an increase in vehicle body manufacturing cost.

In the vehicle rear portion structure according to the aspect of the disclosure, the rear seat may be placed and supported on an upper surface of the cross member.

According to the aspect of the disclosure, in a case where the rear seat is placed and supported on the upper surface of the cross member as described above, the position of the cross member relative to the rear seat (relative position in the vehicle body front-rear direction) needs to be appropriately set in order to sufficiently ensure the support strength of the rear seat. In other words, in types of vehicles in which the arrangement position of the rear seat is on a relatively front side, the arrangement position of the cross member also needs to be set on a relatively front side, and the arrangement position of the cross member also needs to be set on a relatively rear side in types of vehicles in which the arrangement position of the rear seat is on a relatively rear side. As described above, in the aspect of the disclosure, the abutting position of the cross member with respect to the brace can be appropriately selected and the arrangement position of the cross member (position in the vehicle body front-rear direction) can be changed in accordance with the rear seat arrangement position. Accordingly, it is possible to sufficiently ensure the support strength of the rear seat, to reduce the number of places requiring individual design, and to make a contribution to body commonization.

In the vehicle rear portion structure according to the aspect of the disclosure, the brace may have a through-hole penetrating the front side fastening portion in the vehicle body front-rear direction and a through-hole penetrating the rear side fastening portion in the vehicle body front-rear direction. The cross member may have a through-hole penetrating the end edge portion in the vehicle body front-rear direction. The end edge portion of the cross member may be fastened to the brace by a bolt being inserted into each of the through-hole of the front side fastening portion, the through-hole of the rear side fastening portion, and the through-hole of the end edge portion of the cross member in a state where the end edge portion of the cross member abuts against one of the front side fastening portion and the rear side fastening portion.

According to the aspect of the disclosure, the support strength of the cross member can be sufficiently ensured. In addition, it is possible to minimize the number of through-holes formed in each brace. As a result, it is possible to enhance the rigidity of each brace itself and sufficiently ensure the rigidity of the rear wheel house.

In the vehicle rear portion structure according to the aspect of the disclosure, the through-hole of the front side fastening portion and the through-hole of the rear side fastening portion of the brace may have the same diameter. A collar having a bolt insertion hole communicating with the through-holes of the brace may be bridged between the front side fastening portion and the rear side fastening portion. The end edge portion of the cross member may be fastened to the brace by the bolt being inserted into each of the through-hole of the front side fastening portion, the through-hole of the rear side fastening portion, the through-hole of the end edge portion of the cross member, and the bolt insertion hole of the collar.

According to the aspect of the disclosure, in a case where the end edge portion of the cross member is fastened to the brace, the bolt insertion hole of the collar guides bolt insertion, and the workability of the bolt insertion work can be improved. The same type of bolts can be used in a case where the end edge portion of the cross member abuts against and is fastened to the front side fastening portion and a case where the end edge portion of the cross member abuts against and is fastened to the rear side fastening portion, and thus an increase in cost can be suppressed.

According to the aspect of the disclosure, the brace arranged at the vehicle cabin inside part above each of the rear wheel houses is provided with the front side fastening portion and the rear side fastening portion, and each of the end edge portions on both sides of the cross member in the longitudinal direction abuts against and is fastened to one of the front side fastening portion and the rear side fastening portion. As a result, an arrangement position of the cross member suitable for the arrangement position of the rear seat can be obtained without requiring individual design of the brace and the like attributable to different vehicle types (attributable to different arrangement positions of the rear seat). As a result, it is possible to reduce the number of places requiring individual design due to different rear seat arrangement positions. As a result, it is possible to make a contribution to body commonization and to suppress an increase in vehicle body manufacturing cost.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to accompanying drawings. In the present embodiment, a case will be described where the disclosure is applied as a vehicle body rear portion structure of a so-called one-box-type vehicle. It should be noted that the present disclosure is applicable to various types of vehicles and the application of the present disclosure is not limited to one-box-type vehicles.

Schematic Structure of Vehicle Body Rear Portion

Figure 1:
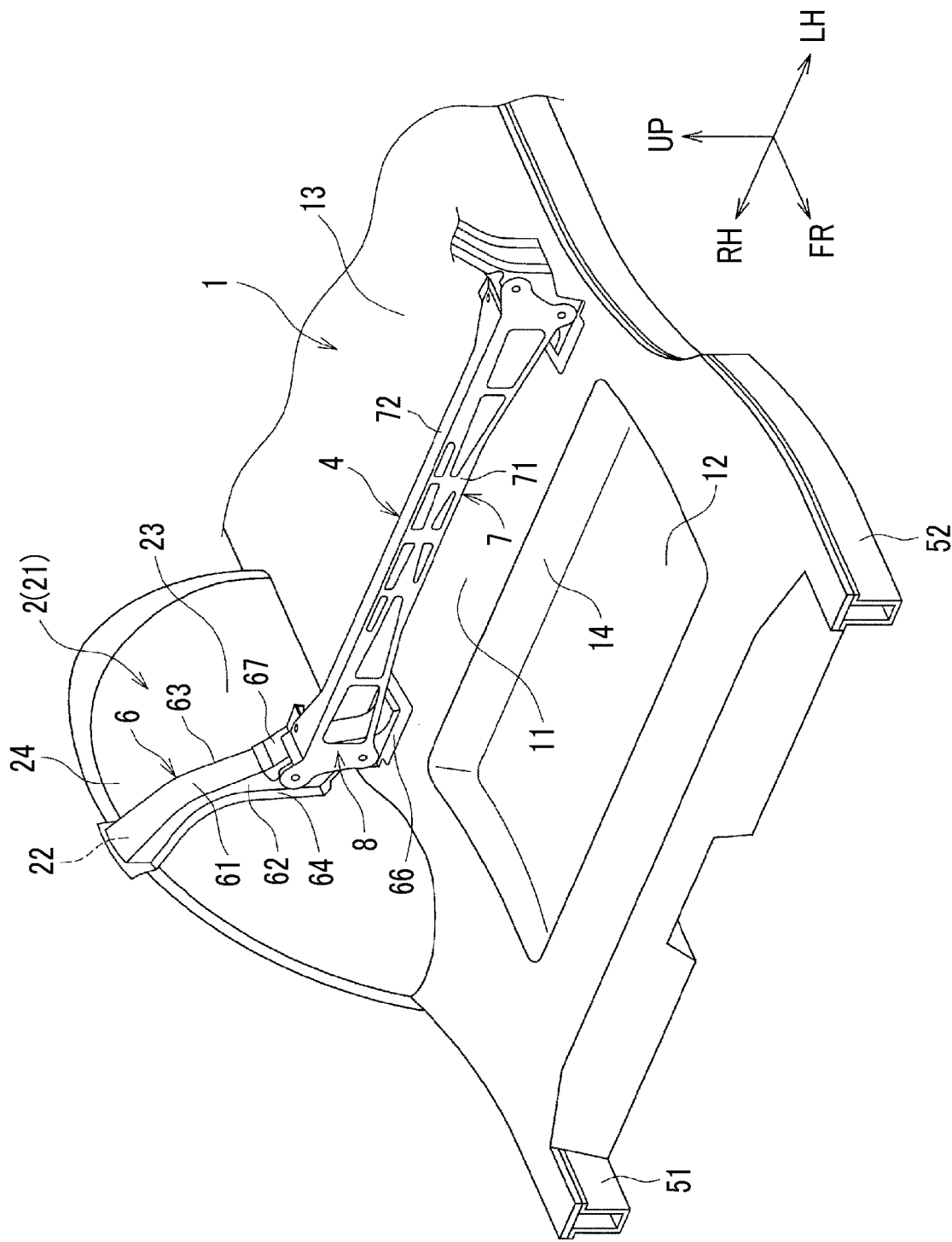
FIG. 1 is a perspective view of a vehicle body rear portion of a vehicle according to an embodiment, illustrating a case where a deck cross member has front side disposition.
Figure 2:
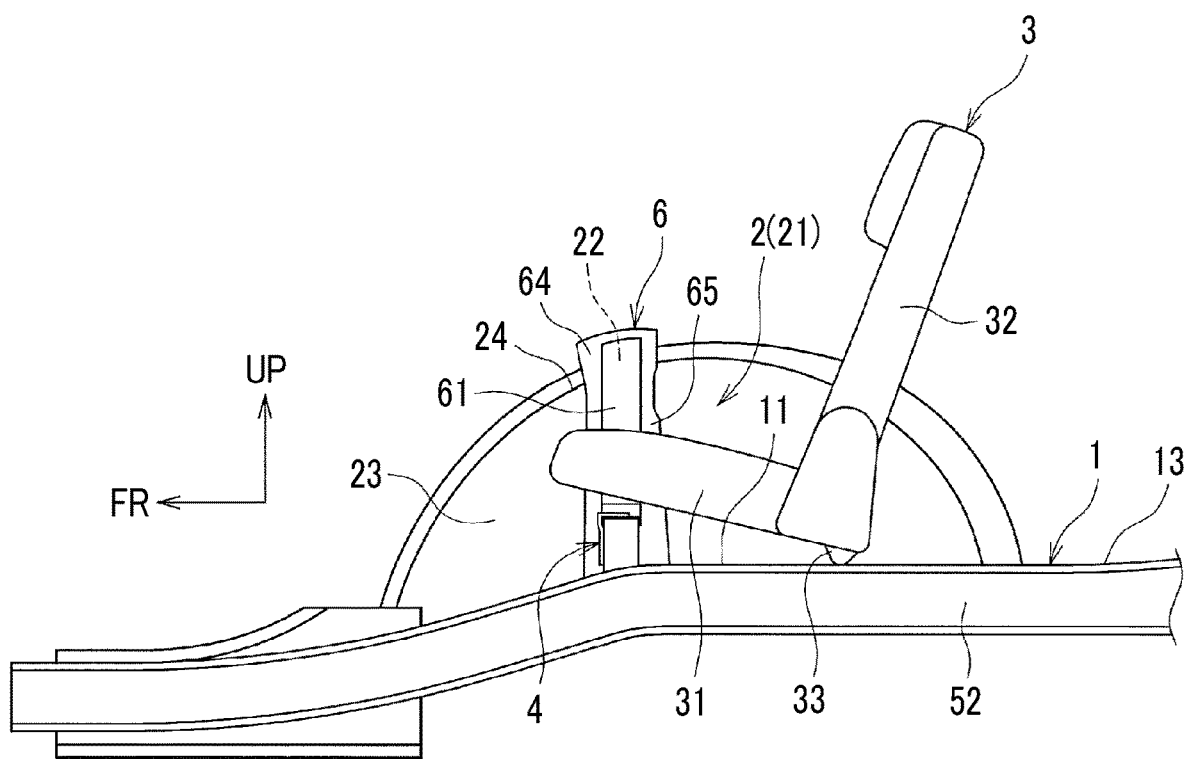
FIG. 2 is a side view of the vehicle body rear portion in the case of the front side disposition of the deck cross member.
Figure 3:
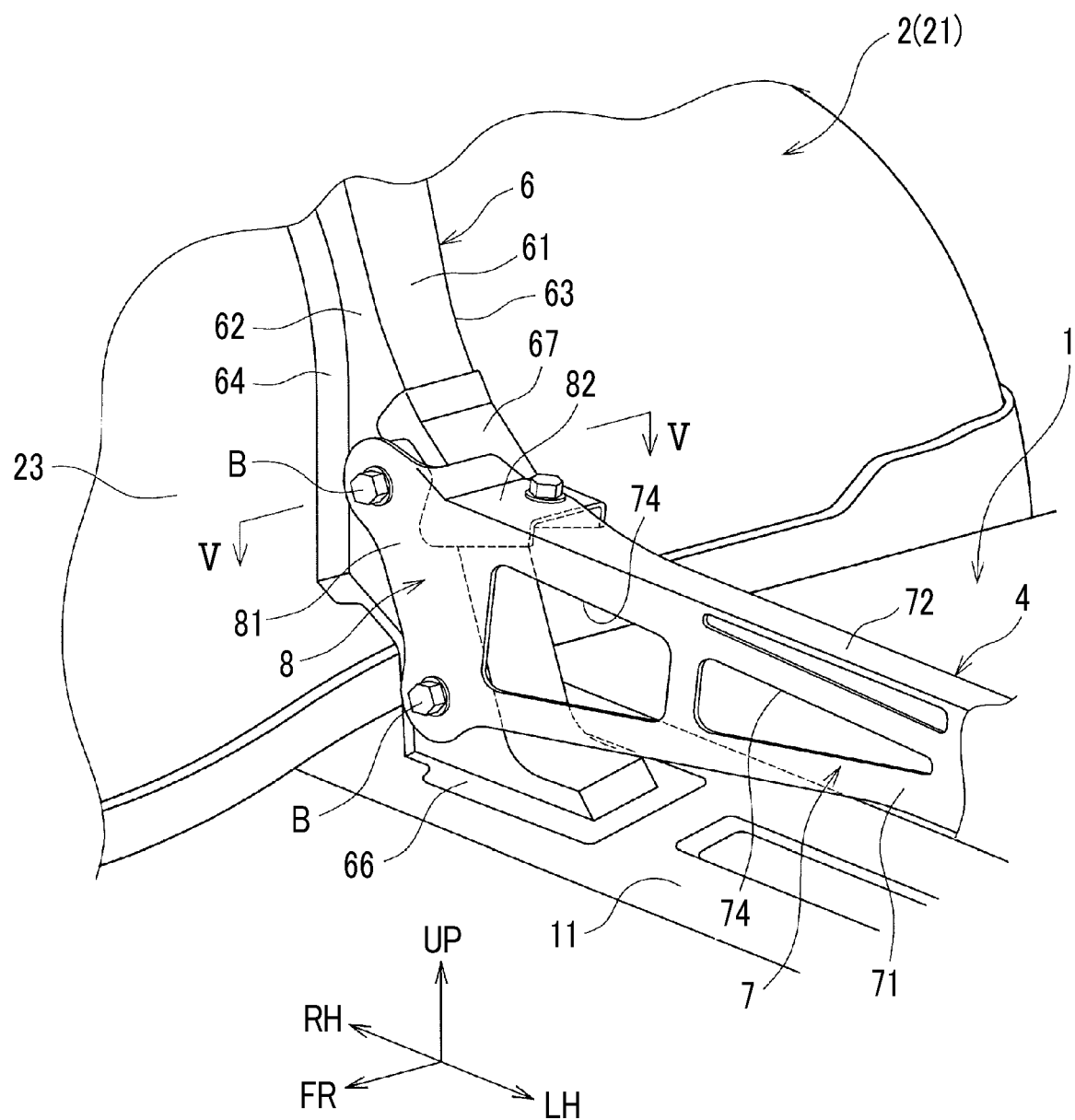
FIG. 3 is an enlarged view of a main portion in the case of the front side disposition of the deck cross member.

A schematic structure of a vehicle body rear portion according to the present embodiment will be described below. FIG. 1 is a perspective view illustrating the vehicle body rear portion of the vehicle according to the present embodiment. FIG. 2 is a side view of the vehicle body rear portion. FIG. 3 is an enlarged view of a main portion of the vehicle body rear portion. The arrow FR in the drawings indicates a vehicle body forward direction, the arrow UP indicates an upward direction, the arrow LH indicates a vehicle body leftward direction, and the arrow RH indicates a vehicle body rightward direction. As a feature of the present embodiment, the disposition form of a deck cross member (cross member, described later) 4 is divided into a case where the deck cross member 4 is disposed on the front side (hereinafter, this disposition form will be referred to as "front side disposition") and a case where the deck cross member 4 is disposed on the rear side (hereinafter, this disposition form will be referred to as "rear side disposition") depending on the types of vehicles. Illustrated in FIGS. 1 to 3 is the front side disposition of the deck cross member 4.

As illustrated in FIGS. 1 to 3, the vehicle body rear portion according to the present embodiment includes a floor panel 1 and rear wheel houses 2 arranged on both sides of the floor panel 1 in the vehicle width direction. The rear wheel house 2 that is on the left side in the vehicle width direction is not illustrated in FIGS. 1 to 3.

The floor panel 1 has a seat installation floor portion 11 where a rear seat 3 (see FIG. 2) is installed via the deck cross member 4 and the like, a seat front side floor portion 12 (see FIG. 1) positioned on the front side of the seat installation floor portion 11 and lower in position than the seat installation floor portion 11, and a rear floor portion 13 extending in the horizontal direction and continuous with the rear side of the seat installation floor portion 11. A kick-up portion 14 rising upwards toward the seat installation floor portion 11 is between the seat front side floor portion 12 and the seat installation floor portion 11.

The rear seat 3 is disposed between the rear wheel houses 2 arranged on both sides in the vehicle width direction. Specifically, the rear seat 3 is provided with a seat cushion 31 constituting a seating portion for an occupant and a reclinable seat back 32 as a backrest portion for an occupant. The front side part of the lower surface of the seat cushion 31 is fixed to the front side part of the seat installation floor portion 11 via the deck cross member 4. The rear side part of the lower surface of the seat cushion 31 is fixed to the rear side part of the seat installation floor portion 11 via a bracket 33.

Rear side frames 51, 52 extending along the vehicle body front-rear direction are joined to the lower surfaces of both side parts of the floor panel 1 in the vehicle width direction. The rear side frames 51, 52 have a hat-shaped cross section open upwards and are joined to the lower surface of the floor panel 1, thereby constituting a closed cross section structure with the floor panel 1.

A rear wheel house inner 21 and a rear wheel house outer (not illustrated) constitute the rear wheel house 2. A rear tire (not illustrated) is disposed in the rear wheel house 2.

The middle portion (here, the meaning of "middle" includes "substantially middle") of the upper surface of the rear wheel house inner 21 in the vehicle body front-rear direction is a damper support portion 22 supporting the upper end portion of a suspension damper (not illustrated).

Brace

A brace 6 is joined to the rear wheel house inner 21 over an upper surface 24 from an inside longitudinal surface 23 facing inwards in the vehicle width direction. The brace 6 has a hat-shaped cross section and is joined over the inside longitudinal surface 23 and the upper surface 24 of the rear wheel house inner 21 and the upper surface of the floor panel 1.

Specifically, the brace 6 is provided with a first plate portion 61, a front side second plate portion (front side fastening portion) 62, and a rear side second plate portion (rear side fastening portion) 63. The first plate portion 61 extends along the upward-downward direction to be along the inside longitudinal surface 23 of the rear wheel house inner 21 (to be along the inside longitudinal surface 23 at a predetermined interval) and extends along the horizontal direction (here, the meaning of "horizontal" includes "substantially horizontal") to be along the upper surface 24 of the rear wheel house inner 21 (to be along the upper surface 24 at a predetermined interval). The front side second plate portion 62 extends outwards in the vehicle width direction from the end edge of the first plate portion 61 on the vehicle body front side. The rear side second plate portion 63 extends outwards in the vehicle width direction from the end edge of the first plate portion 61 on the vehicle body rear side. In addition, the brace 6 is provided with a front side flange portion 64 and a rear side flange portion 65. The front side flange portion 64 extends from the tip edge of the front side second plate portion 62 toward the vehicle body front side and is joined over the upper surface 24 from the inside longitudinal surface 23 of the rear wheel house inner 21. The rear side flange portion 65 extends from the tip edge of the rear side second plate portion 63 toward the vehicle body rear side and is joined over the upper surface 24 from the inside longitudinal surface 23 of the rear wheel house inner 21. As a result, a closed cross section structure is formed between the brace 6 and rear wheel house inner 21.

A lower side flange portion 66 extending along the horizontal direction is provided in the lower portion of the brace 6. The lower side flange portion 66 is joined to the upper surface of the floor panel 1.

As described above, the brace 6 is joined over the floor panel 1 from the rear wheel house inner 21, thereby contributing to improvement of the rigidity of the rear wheel house inner 21 and the portion around the rear wheel house inner 21.

The joining position of the brace 6 on the upper surface 24 of the rear wheel house inner 21 is the damper support portion 22, and the rigidity of the damper support portion 22 is enhanced by the brace 6. As a result, the proof strength of the rear wheel house inner 21 against the load input from the suspension damper is ensured.

Through-holes 62a, 62b, 63a (see FIG. 4 as a perspective view illustrating fastening work for the deck cross member 4 and FIG. 5 as a cross-sectional view taken along line V-V of FIG. 3), into which bolts B are inserted in a case where the deck cross member 4 is fastened, are formed at two places near the lower end portion of each of the front side second plate portion 62 and the rear side second plate portion 63 of the brace 6. The through-holes 62a, 62b, 63a have the same diameter. The front side second plate portion 62 and the rear side second plate portion 63 face each other in the vehicle body front-rear direction, and thus the through-holes 62a, 63a, which are positioned on the upper side among the through-holes 62a, 62b, 63a, face each other in the vehicle body front-rear direction and the center position of each is positioned on a straight line extending in the vehicle body front-rear direction. Likewise, the through-holes 62b positioned on the lower side (illustration of the through-hole positioned on the lower side in the rear side second plate portion 63 being omitted) face each other in the vehicle body front-rear direction and the center position of each is positioned on a straight line extending in the vehicle body front-rear direction.

Figure 5:
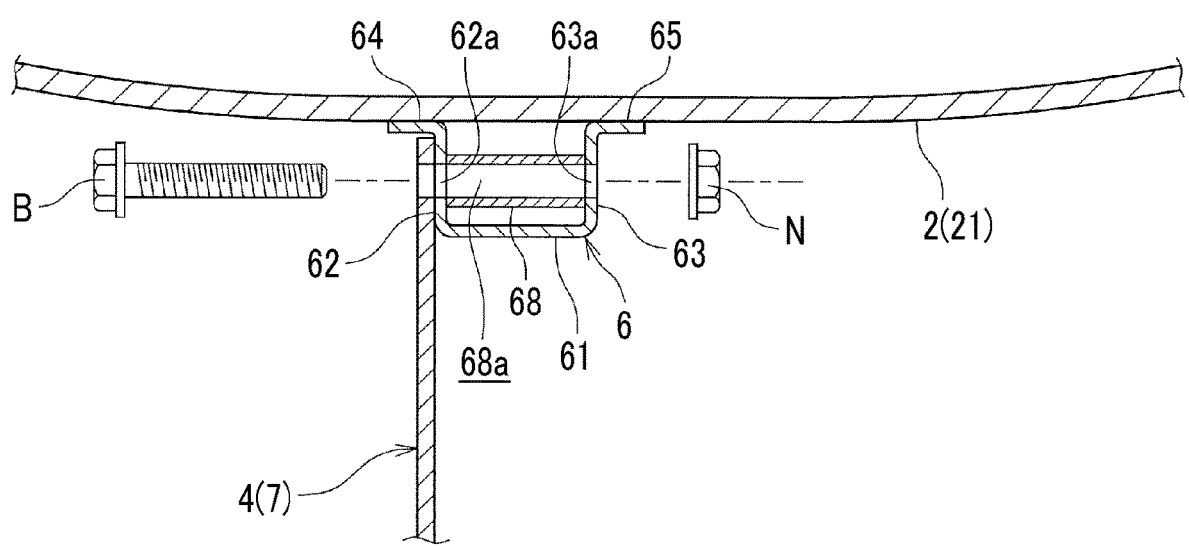
FIG. 5 is a cross-sectional view taken along line V-V of FIG. 3, illustrating bolt insertion work.

A collar 68 is bridged between the front side second plate portion 62 and the rear side second plate portion 63 of the brace 6 (see FIG. 5). As illustrated in FIG. 5, the collar 68 is a cylindrical member, and the inner diameter dimension of the collar 68 is set to be equal to the inner diameter dimension of the through-holes 62a, 63a or slightly larger than the inner diameter dimension of the through-holes 62a, 63a. The length dimension of the collar 68 (dimension in the vehicle body front-rear direction) is equal to the gap dimension between the vehicle body rear side surface of the front side second plate portion 62 and the vehicle body front side surface of the rear side second plate portion 63 (here, the meaning of "equal" includes "substantially equal"). Provided as the collar 68 are the collar 68 on the upper side (illustrated in FIG. 5) corresponding to the through-holes 62*a*, 63*a* positioned on the upper side and the collar on the lower side (not illustrated) corresponding to the through-hole 62*b* positioned on the lower side. In a state where an internal space (bolt insertion hole) 68*a* of the collar 68 communicates with each of the through-holes 62*a*, 63*a*, the front end portion and the rear end portion of the collar 68 are joined by welding to the vehicle body rear side surface of the front side second plate portion 62 and the vehicle body front side surface of the rear side second plate portion 63, respectively.

A bracket 67 extending inwards in the vehicle width direction is joined at an upper side position having a predetermined dimension from the lower end of the first plate portion 61 of the brace 6. A through-hole 67*a* (see FIG. 4), into which the bolt B is inserted in a case where the deck cross member 4 is fastened, is formed in the bracket 67.

Deck Cross Member

Next, the deck cross member 4 fastened to the brace 6 will be described. The deck cross member 4 extends along the vehicle width direction on the lower side of the rear seat 3, and both sides of the deck cross member 4 are fastened to the brace 6 by bolting. In other words, the deck cross member 4 is bridged between the right and left braces 6, and the right and left rear wheel houses 2 are connected to each other by the deck cross member 4 as a result. This results in an increase in the rigidity of the vehicle body rear portion. The deck cross member 4 according to the present embodiment functions as a support portion for the rear seat 3 as well. This will be described in detail below.

The deck cross member 4 in a state of being bridged between the braces 6 has a member body portion 7 positioned in the middle portion in the vehicle width direction and fastening portions 8 positioned on both sides in the vehicle width direction and abutting against and fastened to the braces 6.

The member body portion 7 of the deck cross member 4 is provided with a vertical plate portion 71 extending along the upward-downward direction and the vehicle width direction and an upper side plate portion 72 extending from the upper end edge of the vertical plate portion 71 along the horizontal direction (rearwards in the case of the front side disposition).

Openings 74 are provided at a plurality of places in the vertical plate portion 71 so that the weight of the deck cross member 4 can be reduced. The opening places and the opening areas of the openings 74 are set by an experiment or simulation such that the rigidity of the entire deck cross member 4 can be sufficiently ensured.

The dimension of the upper side plate portion 72 in a direction along the vehicle body front-rear direction is set to be shorter than the dimension of the brace 6 in the direction along the vehicle body front-rear direction (width-direction dimension of the first plate portion 61).

The fastening portion 8 of the deck cross member 4 is provided with a vertical fastening portion 81 and a horizontal fastening portion 82. The vertical fastening portion 81 is continuous with the vertical plate portion 71 and extends outwards in the vehicle width direction. The horizontal fastening portion 82 is continuous with the upper side plate portion 72 and extends outwards in the vehicle width direction.

Through-holes 81*a*, 81*b* (see FIG. 4) are formed in the vertical fastening portion 81 so as to penetrate the upper and lower portions of the vertical fastening portion 81 in the plate thickness direction (vehicle body front-rear direction), respectively. The formation positions of the through-holes 81*a*, 81*b* correspond to the positions of the through-holes 62*a*, 62*b*, 63*a* respectively formed in the front side second plate portion 62 and the rear side second plate portion 63 of the brace 6. A through-hole 82*a* is formed in the horizontal fastening portion 82 so as to penetrate the horizontal fastening portion 82 in the plate thickness direction (substantially vertical direction). The formation position of the through-hole 82*a* corresponds to the position of the through-hole 67*a* formed in the bracket 67.

Deck Cross Member Disposition Form and Fastening Work

The feature of this embodiment lies in that two forms can be adopted as the disposition form of the deck cross member 4 configured as described above. In other words, the single type of deck cross member 4 has two disposition forms.

The front side disposition, in which the deck cross member 4 is disposed on a relatively front side in the vehicle body front-rear direction, can be mentioned as a first disposition form. The front side disposition is applied to types of vehicles in which the arrangement position of the rear seat 3 is on a relatively front side. The rear side disposition, in which the deck cross member 4 is disposed on a relatively rear side in the vehicle body front-rear direction, can be mentioned as a second disposition form. The rear side disposition is applied to types of vehicles in which the arrangement position of the rear seat 3 is on a relatively rear side.

As described above, the deck cross member 4 according to the present embodiment functions as a support portion for the rear seat 3 as well. In order to sufficiently ensure the support strength of the rear seat 3, the position of the deck cross member 4 relative to the rear seat 3 (relative position in the vehicle body front-rear direction) needs to be appropriately set. In other words, in types of vehicles in which the arrangement position of the rear seat 3 is on a relatively front side, the arrangement position of the deck cross member 4 also needs to be set on a relatively front side, and the arrangement position of the deck cross member 4 also needs to be set on a relatively rear side in types of vehicles in which the arrangement position of the rear seat 3 is on a relatively rear side. Accordingly, in the case of application to types of vehicles in which the arrangement position of the rear seat 3 is on a relatively front side, the deck cross member 4 has the front side disposition. The deck cross member 4 has the rear side disposition in the case of application to types of vehicles in which the arrangement position of the rear seat 3 is on a relatively rear side. As a result, the support strength of the rear seat 3 can be sufficiently ensured along with the foot space of an occupant seated on the rear seat 3.

Fastening work for the deck cross member 4 will be described below.

Figure 4:
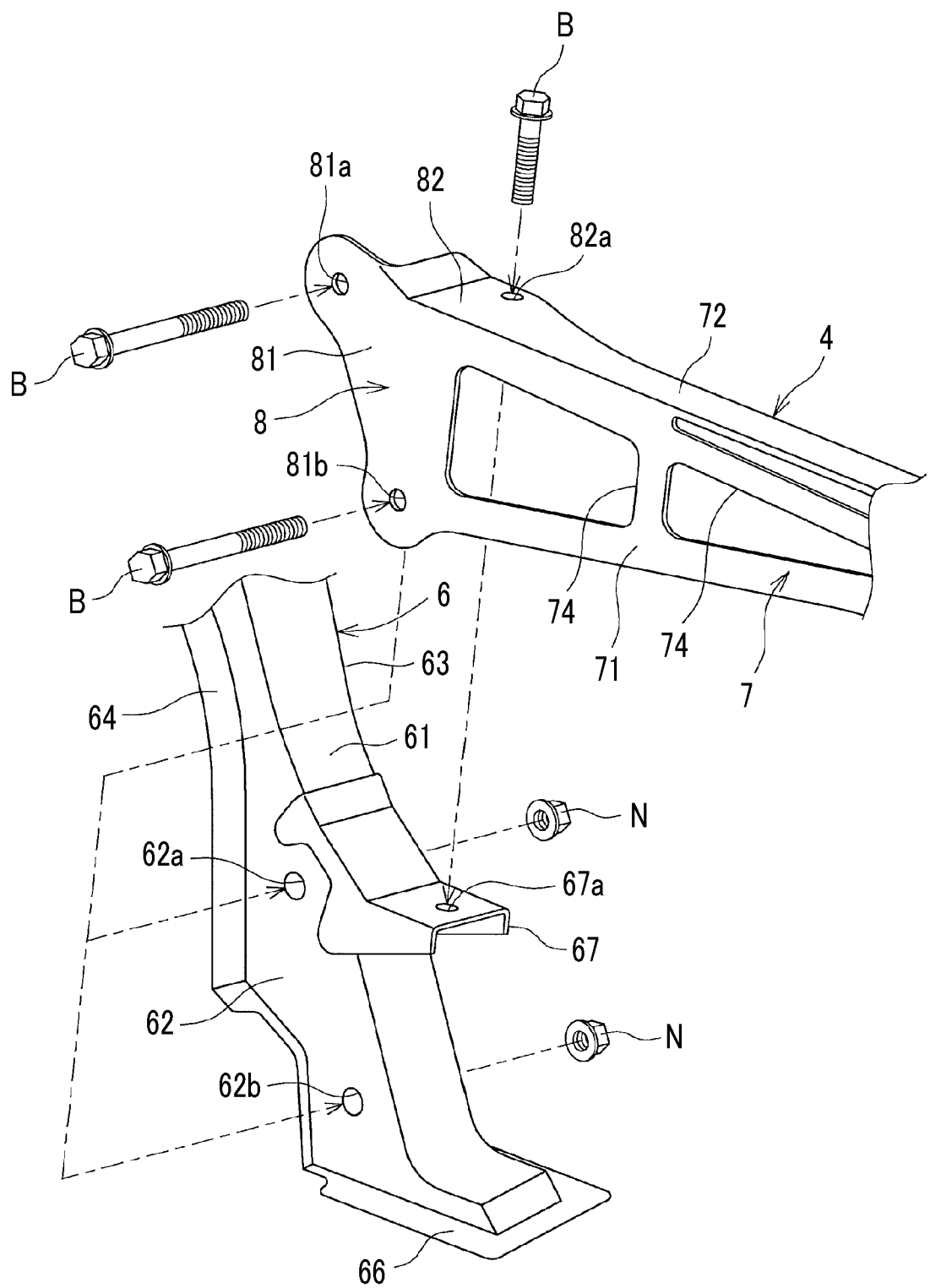
FIG. 4 is a perspective view illustrating deck cross member fastening work in the case of the front side disposition of the deck cross member.

As illustrated in FIGS. 3 to 5, in a case where the deck cross member 4 has the front side disposition, the vertical plate portion 71 of the deck cross member 4 is positioned on the front side in the vehicle body front-rear direction, and the vertical fastening portion 81 of the fastening portion 8 overlaps the front surface of the front side second plate portion 62 of the brace 6 (surface facing the vehicle body front side). The through-holes 81*a*, 81*b* formed in the vertical fastening portion 81 are aligned with the through-holes 62*a*, 62*b* formed in the front side second plate portion 62 of the brace 6, respectively. The through-hole 82*a* formed in the horizontal fastening portion 82 of the deck cross member 4 is aligned with the through-hole 67*a* formed in the bracket 67. In this state, the bolts B are inserted into each of the through-holes 81*a*, 81*b* of the vertical fastening portion 81 of the deck cross member 4, the through-holes 62a, 62b of the front side second plate portion 62, the bolt insertion hole 68a of the collar 68, and the through-hole 63a of the rear side second plate portion 63 from the vehicle body front side, and the bolts B are screwed into nuts N arranged on the vehicle body rear side of the rear side second plate portion 63. The bolt B is inserted into each of the through-hole 82a of the horizontal fastening portion 82 of the deck cross member 4 and the through-hole 67a of the bracket 67 from the vehicle body upper side, and the bolt B is screwed into a nut arranged on the lower side of the bracket 67. As a result, the fastening portion 8 of the deck cross member 4 is fastened to the brace 6. In this state, the deck cross member 4 is arranged on a relatively front side in the vehicle body front-rear direction (see FIG. 2). Subsequently, the seat cushion 31 is attached to the upper side plate portion 72 of the deck cross member 4 (for example, a pin protruding from the front side part of the lower surface of the seat cushion 31 is inserted into and attached to a pin hole provided in the upper side plate portion 72). As a result, it is possible to sufficiently ensure the support strength of the rear seat 3 arranged on a relatively front side.

Figure 6:
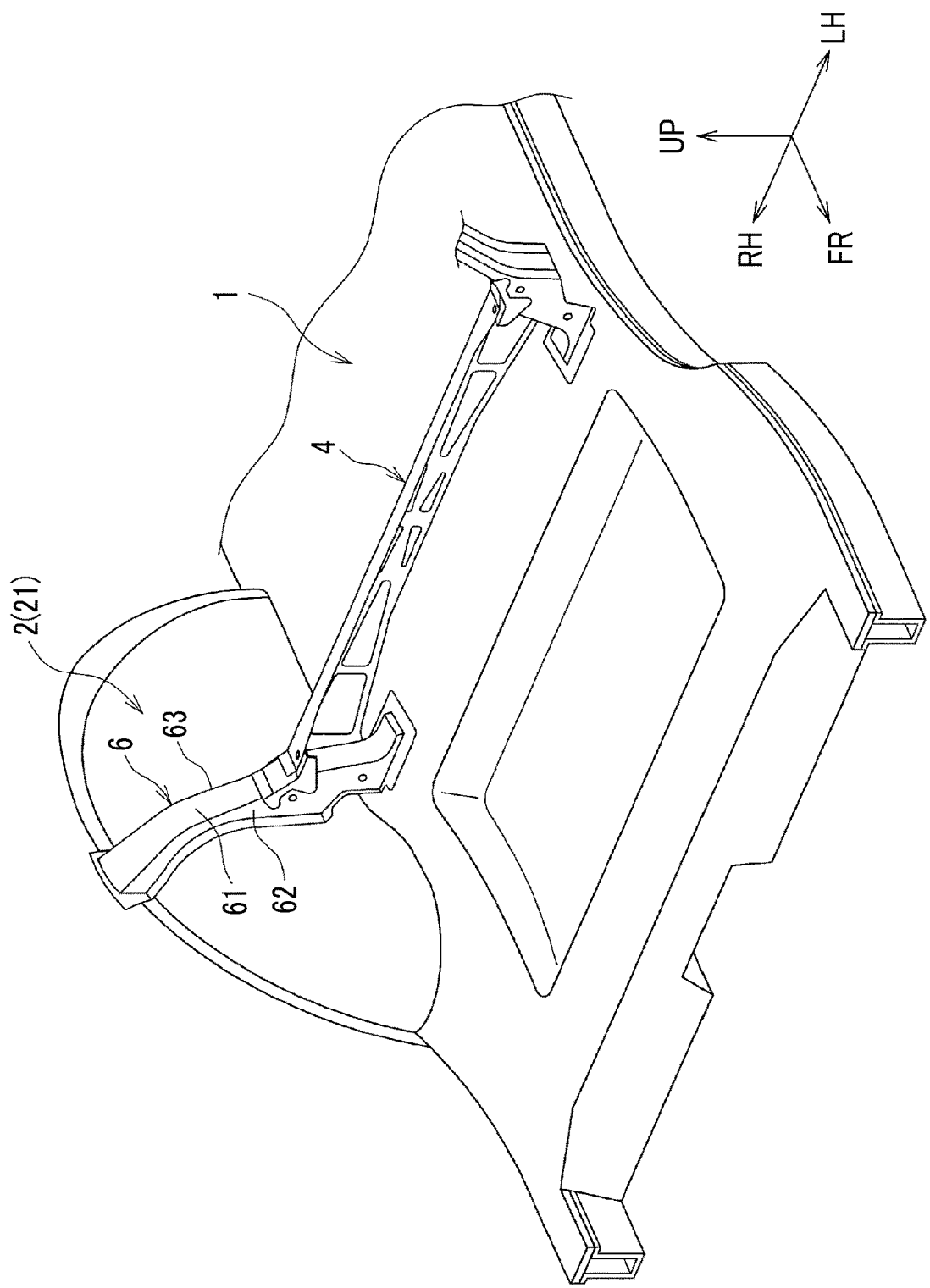
FIG. 6 is a perspective view of the vehicle body rear portion, illustrating a case where the deck cross member has rear side disposition.
Figure 7:
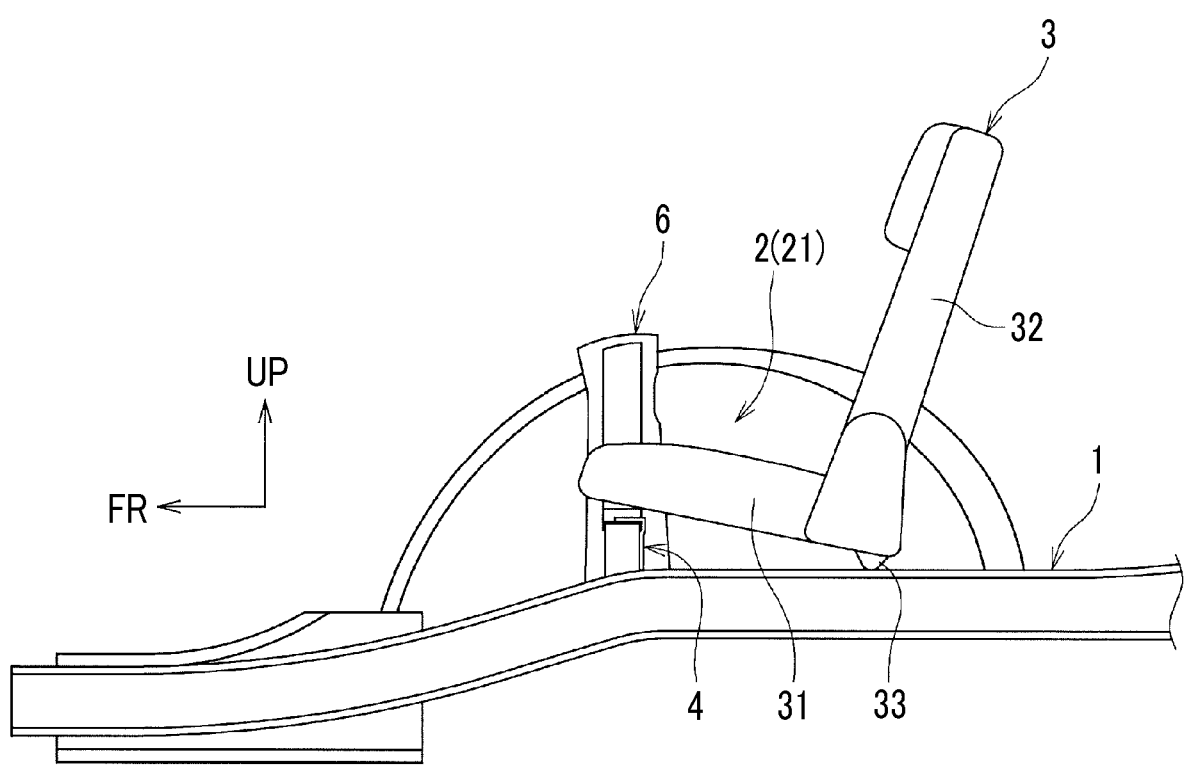
FIG. 7 is a side view of the vehicle body rear portion in the case of the rear side disposition of the deck cross member.
Figure 8:
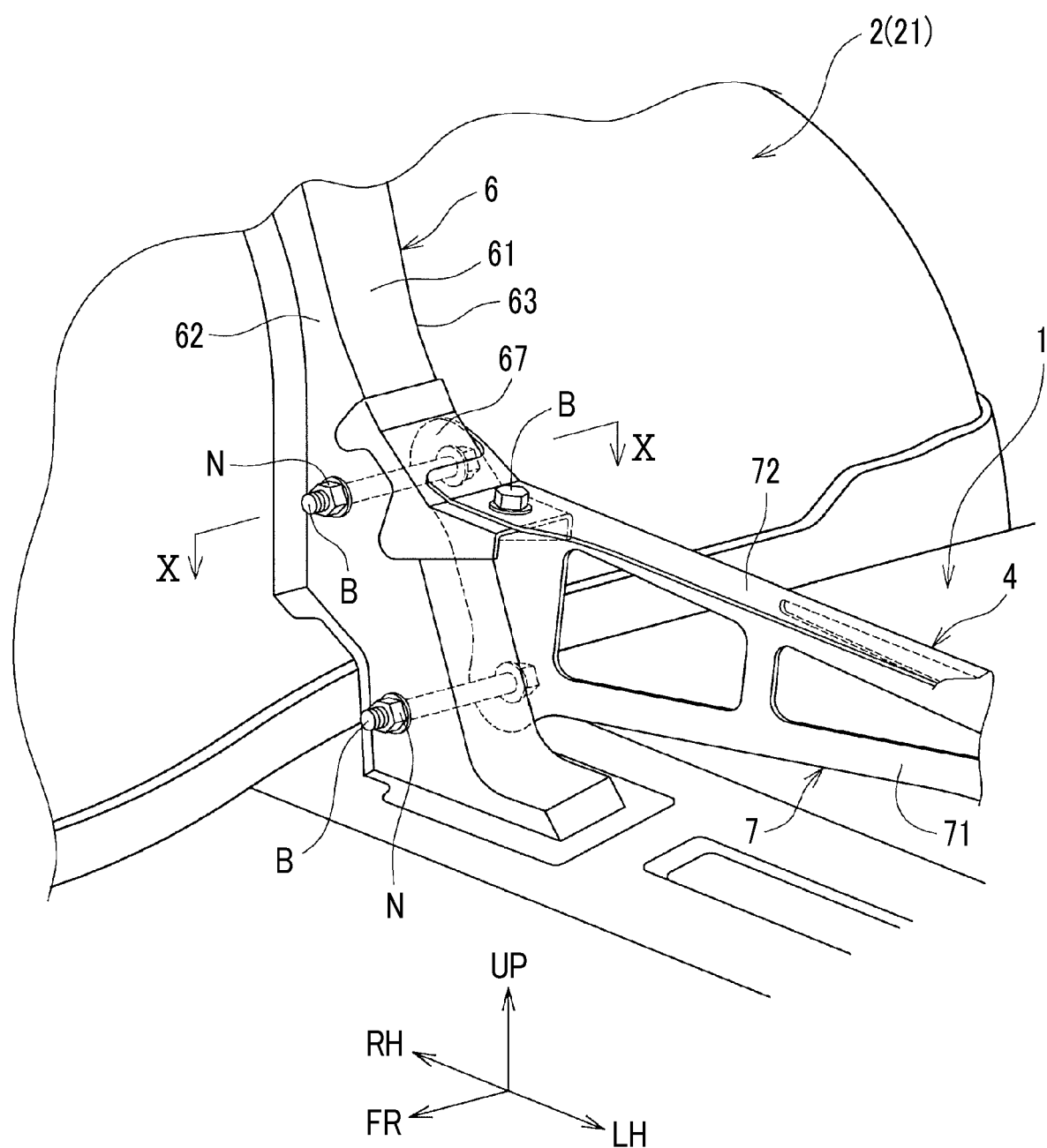
FIG. 8 is an enlarged view of a main portion in the case of the rear side disposition of the deck cross member.
Figure 9:
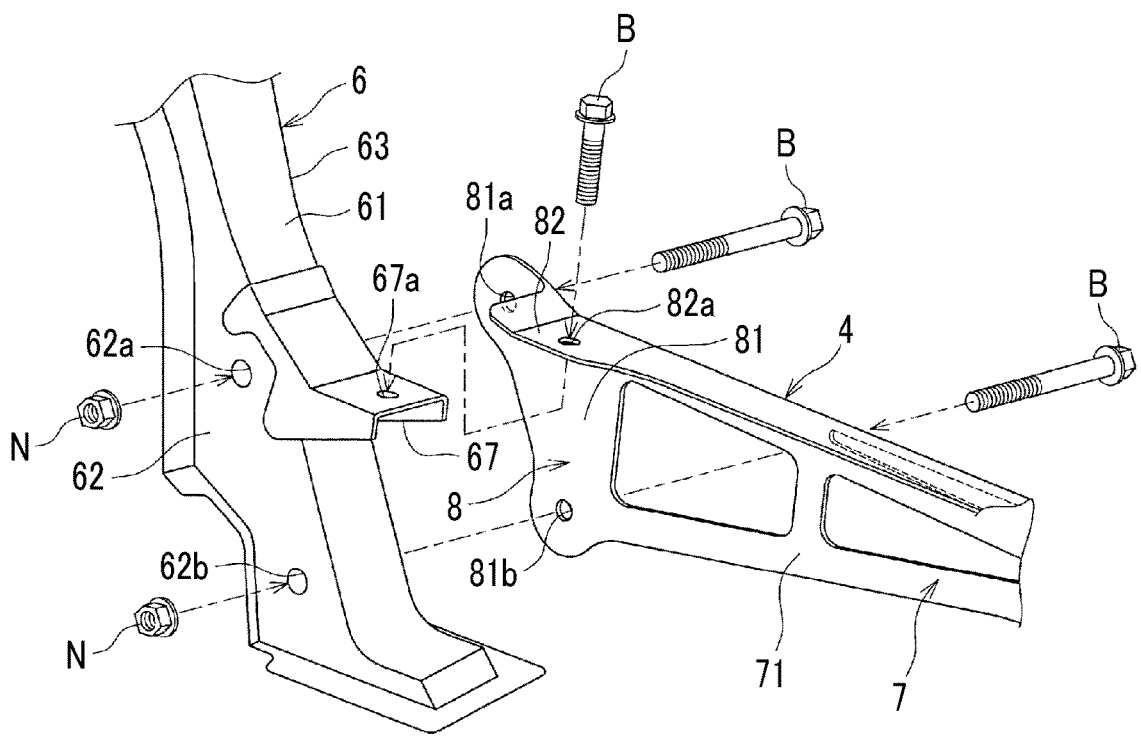
FIG. 9 is a perspective view illustrating deck cross member fastening work in the case of the rear side disposition of the deck cross member.
Figure 10:
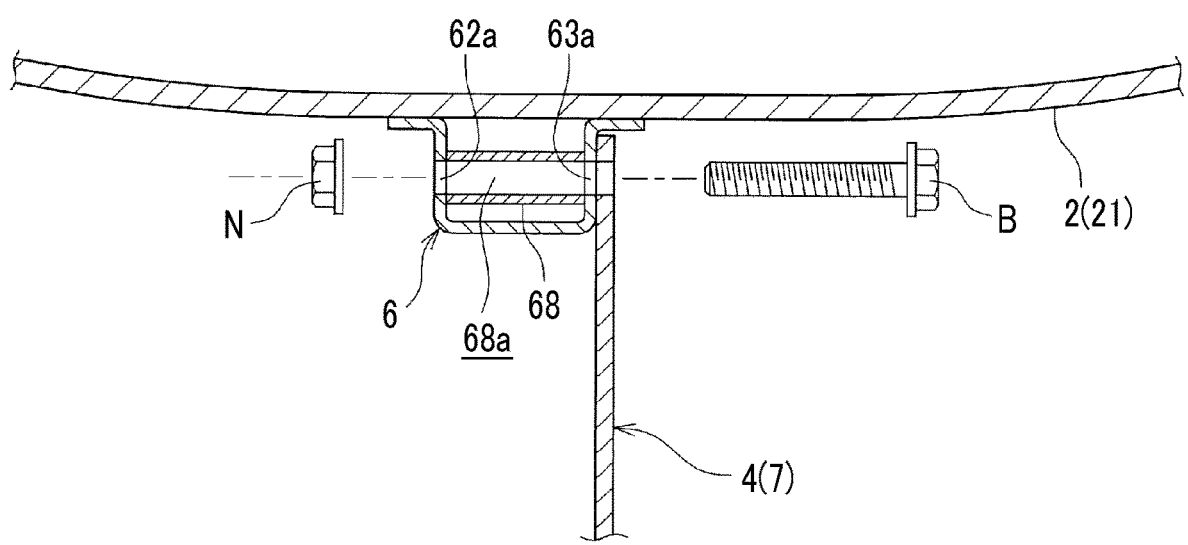
FIG. 10 is a cross-sectional view taken along line X-X of FIG. 8, illustrating bolt insertion work.

As illustrated in FIGS. 8 to 10, in a case where the deck cross member 4 has the rear side disposition, the vertical plate portion 71 of the deck cross member 4 is positioned on the rear side in the vehicle body front-rear direction (with the right and left reversed from the case of the front side disposition), and the vertical fastening portion 81 of the fastening portion 8 overlaps the rear surface of the rear side second plate portion 63 of the brace 6 (surface facing the vehicle body rear side). The through-holes 81a, 81b formed in the vertical fastening portion 81 are aligned with the through-holes 63a formed in the rear side second plate portion 63 of the brace 6, respectively. The through-hole 82a formed in the horizontal fastening portion 82 of the deck cross member 4 is aligned with the through-hole 67a formed in the bracket 67. In this state, the bolts B are inserted into each of the through-holes 81a, 81b of the vertical fastening portion 81 of the deck cross member 4, the through-hole 63a of the rear side second plate portion 63, the bolt insertion hole 68a of the collar 68, and the through-holes 62a, 62b of the front side second plate portion 62 from the vehicle body rear side, and the bolts B are screwed into the nuts N arranged on the vehicle body front side of the front side second plate portion 62. The bolt B is inserted into each of the through-hole 82a of the horizontal fastening portion 82 of the deck cross member 4 and the through-hole 67a of the bracket 67 from the vehicle body upper side, and the bolt B is screwed into a nut arranged on the lower side of the bracket 67. As a result, the fastening portion 8 of the deck cross member 4 is fastened to the brace 6. In this state, the deck cross member 4 is arranged on a relatively rear side in the vehicle body front-rear direction (see FIGS. 6 and 7). Subsequently, the seat cushion 31 is attached to the upper side plate portion 72 of the deck cross member 4. As a result, it is possible to sufficiently ensure the support strength of the rear seat 3 arranged on a relatively rear side and to sufficiently ensure the foot space of an occupant seated on the rear seat 3.

As described above, in the present embodiment, the deck cross member 4 can be arranged on a relatively front side in the vehicle body front-rear direction in types of vehicles in which the arrangement position of the rear seat 3 is on a relatively front side and the deck cross member 4 can be arranged on a relatively rear side in the vehicle body front-rear direction in types of vehicles in which the arrangement position of the rear seat 3 is on a relatively rear side by the abutting position of the deck cross member 4 with respect to the brace 6 being appropriately selected. Accordingly, an arrangement position of the deck cross member 4 (position in the vehicle body front-rear direction) suitable for the arrangement position of the rear seat 3 can be obtained without requiring individual design of the brace 6 and the like attributable to different vehicle types (attributable to different arrangement positions of the rear seat 3). As a result, it is possible to reduce the number of places requiring individual design due to different arrangement positions of the rear seat 3, to make a contribution to body commonization, and to suppress an increase in vehicle body manufacturing cost. In addition, since an arrangement position of the deck cross member 4 suitable for the arrangement position of the rear seat 3 is obtained, the support strength of the rear seat 3 can be sufficiently ensured.

The collar 68 is bridged between the front side second plate portion 62 and the rear side second plate portion 63 of the brace 6. Accordingly, in a case where the vertical fastening portion 81 of the deck cross member 4 is fastened to the brace 6, the bolt insertion hole 68a of the collar 68 guides the insertion of the bolts B, and the workability of the insertion work for the bolts B can be improved. The through-holes 62a, 62b, 63a formed in the front side second plate portion 62 and the rear side second plate portion 63 have the same diameter. Accordingly, the same type of bolts B can be used for the front side disposition and the rear side disposition of the deck cross member 4 and an increase in cost can be suppressed.

OTHER EMBODIMENTS

It should be noted that the present disclosure is not limited to the embodiment described above and all modifications and applications within the scope of the claims and a scope equivalent to the scope of the claims are possible.

For example, in the embodiment described above, the bolts B are inserted into each of the through-holes 62a, 62b of the front side second plate portion 62 of the brace 6 and the through-hole 63a of the rear side second plate portion 63 as the fastening structure of the deck cross member 4 with respect to the brace 6. However, the present disclosure is not limited thereto. In the case of the front side disposition of the deck cross member 4, the deck cross member 4 may be fastened to the brace 6 by the bolts B being inserted simply into each of the through-holes 81a, 81b of the deck cross member 4 and the through-holes 62a, 62b of the front side second plate portion 62 of the brace 6. Likewise, in the case of the rear side disposition of the deck cross member 4, the deck cross member 4 may be fastened to the brace 6 by the bolts B being inserted simply into each of the through-holes 81a, 81b of the deck cross member 4 and the through-hole 63a of the rear side second plate portion 63 of the brace 6.

In the above embodiment, the seat cushion 31 is attached to the upper side plate portion 72 of the deck cross member 4. In other words, the deck cross member 4 is provided with a function as a support portion for the rear seat 3. In the disclosure, the deck cross member 4 does not necessarily have to function as a support portion for the rear seat 3. In other words, the deck cross member 4 may be configured to have a sole function of enhancing the rigidity of the vehicle body rear portion.

The disclosure can be applied to an attachment structure for a deck cross member extending along a vehicle width direction between braces respectively arranged in rear wheel houses.

What is claimed is:

1. A vehicle body rear portion structure comprising:
a floor panel;
rear wheel houses arranged on both sides of the floor panel in a vehicle width direction;
a rear seat disposed between the rear wheel houses;
braces each arranged at a vehicle cabin inside part above each of the rear wheel houses; and
a cross member extending along the vehicle width direction between the braces, wherein:
the brace is provided with
   a front side fastening portion positioned on a front side of the brace in a vehicle body front-rear direction, and
   a rear side fastening portion positioned on a rear side of the brace in the vehicle body front-rear direction; and
each of end edge portions on both sides of the cross member in a longitudinal direction abuts against one of the front side fastening portion and the rear side fastening portion and is fastened to the brace,
wherein the rear seat is placed and supported on an upper surface of the cross member.

2. The vehicle body rear portion structure according to claim 1, wherein:
the brace has
   a through-hole penetrating the front side fastening portion in the vehicle body front-rear direction, and
   a through-hole penetrating the rear side fastening portion in the vehicle body front-rear direction;
the cross member has a through-hole penetrating the end edge portion in the vehicle body front-rear direction; and
the end edge portion of the cross member is fastened to the brace by a bolt being inserted into each of the through-hole of the front side fastening portion, the through-hole of the rear side fastening portion, and the through-hole of the end edge portion of the cross member in a state where the end edge portion of the cross member abuts against one of the front side fastening portion and the rear side fastening portion.

3. The vehicle body rear portion structure according to claim 2, wherein:
the through-hole of the front side fastening portion and the through-hole of the rear side fastening portion of the brace have the same diameter;
a collar having a bolt insertion hole communicating with the through-holes of the brace is bridged between the front side fastening portion and the rear side fastening portion; and
the end edge portion of the cross member is fastened to the brace by the bolt being inserted into each of the through-hole of the front side fastening portion, the through-hole of the rear side fastening portion, the through-hole of the end edge portion of the cross member, and the bolt insertion hole of the collar.

4. A vehicle body rear portion structure comprising:
a floor panel;
rear wheel houses arranged on both sides of the floor panel in a vehicle width direction;
a rear seat disposed between the rear wheel houses;
braces each arranged at a vehicle cabin inside part above each of the rear wheel houses; and
a cross member extending along the vehicle width direction between the braces, wherein:
the brace is provided with
   a front side fastening portion positioned on a front side of the brace in a vehicle body front-rear direction, and
   a rear side fastening portion positioned on a rear side of the brace in the vehicle body front-rear direction; and
each of end edge portions on both sides of the cross member in a longitudinal direction abuts against one of the front side fastening portion and the rear side fastening portion and is fastened to the brace,
wherein the brace has
   a through-hole penetrating the front side fastening portion in the vehicle body front-rear direction, and
   a through-hole penetrating the rear side fastening portion in the vehicle body front-rear direction;
the cross member has a through-hole penetrating the end edge portion in the vehicle body front-rear direction; and
the end edge portion of the cross member is fastened to the brace by a bolt being inserted into each of the through-hole of the front side fastening portion, the through-hole of the rear side fastening portion, and the through-hole of the end edge portion of the cross member in a state where the end edge portion of the cross member abuts against one of the front side fastening portion and the rear side fastening portion;
the through-hole of the front side fastening portion and the through-hole of the rear side fastening portion of the brace have the same diameter;
a collar having a bolt insertion hole communicating with the through-holes of the brace is bridged between the front side fastening portion and the rear side fastening portion; and
the end edge portion of the cross member is fastened to the brace by the bolt being inserted into each of the through-hole of the front side fastening portion, the through-hole of the rear side fastening portion, the through-hole of the end edge portion of the cross member, and the bolt insertion hole of the collar.

5. A vehicle body rear portion structure comprising:
a floor panel;
rear wheel houses arranged on both sides of the floor panel in a vehicle width direction;
a rear seat disposed between the rear wheel houses;
braces each arranged at a vehicle cabin inside part above each of the rear wheel houses;
a cross member extending along the vehicle width direction between the braces; and
a bracket coupled to and extending between the brace and the cross member, wherein the brace is provided with
   a front side fastening portion positioned on a front side of the brace in a vehicle body front-rear direction, and
   a rear side fastening portion positioned on a rear side of the brace in the vehicle body front-rear direction; and
each of end edge portions on both sides of the cross member in a longitudinal direction abuts against one of the front side fastening portion and the rear side fastening portion and is fastened to the brace via the bracket.

6. The vehicle body rear portion structure according to claim 5, wherein the rear seat is placed and supported on an upper surface of the cross member.

7. The vehicle body rear portion structure according to claim 5, wherein:
the brace has
   a through-hole penetrating the front side fastening portion in the vehicle body front-rear direction, and a through-hole penetrating the rear side fastening portion in the vehicle body front-rear direction;

the cross member has a through-hole penetrating the end edge portion in the vehicle body front-rear direction; and the end edge portion of the cross member is fastened to the brace by a bolt being inserted into each of the through-hole of the front side fastening portion, the through-hole of the rear side fastening portion, and the through-hole of the end edge portion of the cross member in a state where the end edge portion of the cross member abuts against one of the front side fastening portion and the rear side fastening portion.

8. The vehicle body rear portion structure according to claim 7, wherein:

the through-hole of the front side fastening portion and the through-hole of the rear side fastening portion of the brace have the same diameter;

a collar having a bolt insertion hole communicating with the through-holes of the brace is bridged between the front side fastening portion and the rear side fastening portion; and the end edge portion of the cross member is fastened to the brace by the bolt being inserted into each of the through-hole of the front side fastening portion, the through-hole of the rear side fastening portion, the through-hole of the end edge portion of the cross member, and the bolt insertion hole of the collar.

\* \* \* \* \*